H. B. HOECKELBERG.
DEVICE FOR SLAUGHTERING ANIMALS.
APPLICATION FILED NOV. 17, 1911.

1,021,523.  Patented Mar. 26, 1912.

Witnesses:

Inventor
Herman B. Hoeckelberg
By his Attorney
Clarkson A. Collins

H. B. HOECKELBERG.
DEVICE FOR SLAUGHTERING ANIMALS.
APPLICATION FILED NOV. 17, 1911.
1,021,523.
Patented Mar. 26, 1912.
2 SHEETS—SHEET 2.
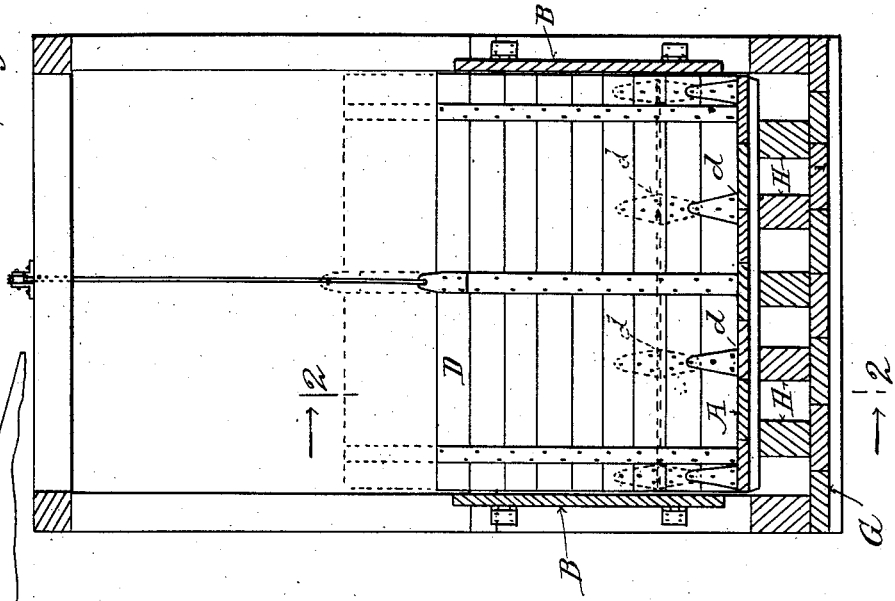
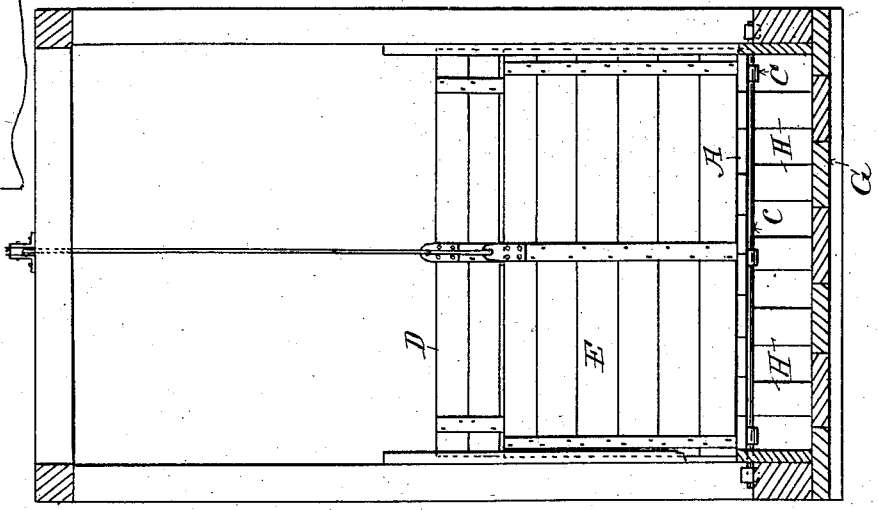
Inventor
Herman B Hoeckelberg
By his Attorney
Clarkson A. Collins.
Witnesses:

UNITED STATES PATENT OFFICE.

HERMAN B. HOECKELBERG, OF CLIFFSIDE, NEW JERSEY.

DEVICE FOR SLAUGHTERING ANIMALS.

1,021,523.  Specification of Letters Patent.  Patented Mar. 26, 1912.

Application filed November 17, 1911. Serial No. 660,860.

*To all whom it may concern:*

Be it known that I, HERMAN B. HOECKELBERG, a citizen of the United States, residing at Cliffside, in the county of Bergen and State of New Jersey, have invented a new and Improved Device for Slaughtering Animals, of which the following is a specification.

My invention relates particularly to devices for use in the slaughtering of beeves and the object of my improvements is to enable the operation of slaughtering to be conducted with a greater convenience and safety to the operators and with less suffering to the animal than heretofore.

To this end my invention consists in the construction and combination of parts hereinafter described and illustrated in the accompanying drawings forming a part hereof, by reference to which the invention will be best understood.

Figure 1:
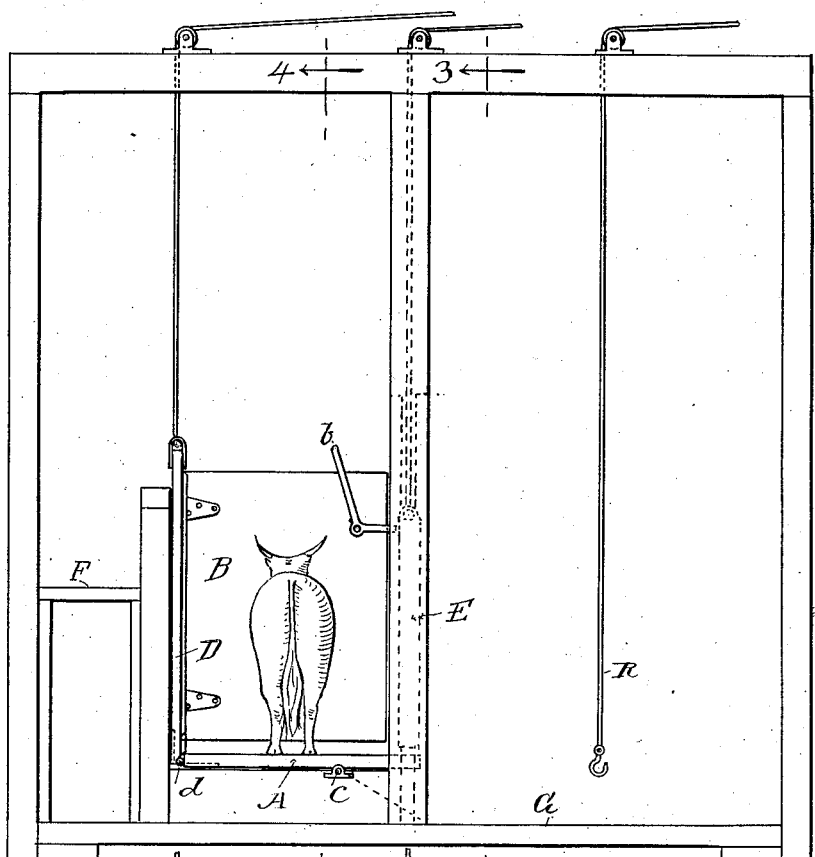
Figure 2:
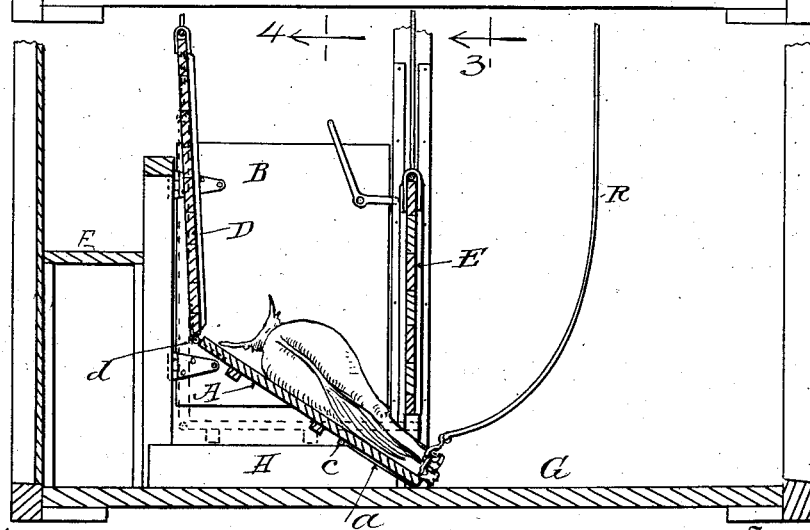

Figure 1 of the drawing shows an end view of the device with the entrance door removed and a bullock in position therein. Fig. 2 shows a section of the device on line 2—2 with the stall floor tilted. Fig. 3 is a sectional view on lines 3, 3, of Fig. 1. Fig. 4 is a sectional view on line 4, 4, of Fig. 1. Fig. 5 is an enlarged cross section of the floor of the receiving stall.

Referring to the drawings, A indicates the floor of the receiving stall into which the animal is driven prior to being slaughtered, and which is closed at the ends as by doors, B, to prevent egress. It will be understood that in practice there may be a series of these stalls of any desired number separated by doors as B secured by latches, b.

The floor, A, is, at a point near one side, pivotally secured as shown at, C, and its opposite edge is hinged as shown at, d, to the side, D, of the stall which is vertically movable. The other side of the stall consists of a vertically movable door or partition, E, which comes down to, or close to, the floor, A, when the latter is in a horizontal position. When the stall side, D, is lifted the floor, A, is tilted and the side, a, of the floor descends leaving a sufficient space between the floor and the door E for the passage of the feet and legs of the bullock. Outside of the stall side, D, is a platform, F, which may extend alongside a series of stalls upon which one stands to direct the movement of the cattle into the stalls and operate the mechanism for moving the sides, D, and, E, of the stall.

In using the device the animal to be slaughtered is driven into the stall which is then closed at the ends against egress. The stall side, D, is then lifted, thus lifting and tilting the floor, A. By the tilting of the floor, A, the animal is thrown upon its side and slides down to the lower part of the floor so that its feet and legs project through the opening between the door, E, and floor as shown in Fig. 2, its body however, being prevented from passing by the door E. While in this position its legs are held against movement between the lower edge of the door, E, and the floor, A. Its hind legs are then shackled together and a rope or chain as, R, is secured to the shackle. The door, E, is then lifted and the animal is drawn out of the stall upon the slaughtering floor, G, after which the operation of slaughtering and removing its body proceeds in the usual manner.

By means of this device the animal is automatically brought into a position where it can be shackled and then slaughtered without danger to the operator and with a minimum of injury and suffering to the animal itself, advantages which will be readily appreciated by those skilled in the art.

What I claim as new and desire to secure by Letters Patent is:—

1. In a stall for receiving cattle to be slaughtered the combination of a tiltable floor, a vertical stall side, and means for tilting the floor whereby the animal is cast thereon, and its legs are caused to project from the stall between the floor and said stall side.

2. A stall for receiving cattle to be slaughtered having a tiltable floor and provided with a vertically movable side so arranged in relation to the floor that when the floor is tilted a limited open space is formed between such side and the lower portion of the floor such that the legs of the cast animal are secured in said space between the floor and said side.

3. In a stall for receiving cattle to be slaughtered the combination of a floor pivotally mounted near one side thereof and a vertically movable stall side pivotally secured to the opposite side of said floor whereby the floor may be tilted substantially as set forth.

4. In a stall for receiving cattle to be slaughtered the combination of a tiltable floor, means for tilting the same and a stall side so arranged as to provide between it and the floor, when the latter is tilted a space sufficient to receive and secure the legs of the animal, and to be moved to subsequently permit the passage of the body of the animal substantially as set forth.

In testimony whereof, I have hereunto subscribed my name, this 16th day of November A. D., 1911.

HERMAN B. HOECKELBERG.

Witnesses:
E. W. WYATT,
CLARKSON A. COLLINS.

Copies of this patent may be obtained for five cents each, by addressing the "Commissioner of Patents, Washington, D. C."